April 9, 1963 W. S. MILLER 3,084,564
INTERMITTENT OPERATION MECHANICAL POWER AMPLIFIER
Filed May 17, 1960 2 Sheets-Sheet 1

INVENTOR.
WENDELL S. MILLER
BY William P. Green
ATTORNEY

April 9, 1963 W. S. MILLER 3,084,564
INTERMITTENT OPERATION MECHANICAL POWER AMPLIFIER
Filed May 17, 1960 2 Sheets-Sheet 2

INVENTOR.
WENDELL S. MILLER
BY William P. Green
ATTORNEY

United States Patent Office 3,084,564
Patented Apr. 9, 1963

3,084,564
INTERMITTENT OPERATION MECHANICAL
POWER AMPLIFIER
Wendell S. Miller, 1341 Comstock Ave.,
Los Angeles, Calif.
Filed May 17, 1960, Ser. No. 29,666
14 Claims. (Cl. 74—388)

This invention relates to mechanical power amplifiers of a type particularly designed for intermittent rather than continuous operation. Certain features of the amplifiers disclosed herein have been shown and claimed in my copending application filed of even date herewith and entitled "Mechanical Power Amplifier."

A device constructed in accordance with the invention includes a control input shaft adapted to be turned manually or in any other manner, and an output shaft which is mechanically driven in exact correspondence with the rotary movements of the control input shaft. The amplifier functions to provide at the output shaft a torque which is much greater than the torque actuating the control input shaft, so that the amplifier is capable of driving a relatively heavy piece of equipment in response to very small input forces. To supply the increased torque, the apparatus includes a motor or motors adapted to be clutched to and drive the output shaft in response to actuation of the control input shaft. The manual or other low power turning movement of the control input shaft functions merely to control the clutching means by which the power operated motor or motors are connected to the output shaft.

In the prior power amplifiers of this general type with which I am familiar, the driving motor or power source operates continuously, so that it may be clutched into driving engagement with the output shaft instantaneously in response to an input or control force. The response of a device of this general type to an input force is therefore very rapid. The disadvantage of this type of power amplifier, however, for intermittent or only occasional operation, resides in the fact that the motor never stops even though very long periods of time may occur between successive actuations of the control input shaft. This of course is very inefficient, wasteful of energy, and causes the motor to wear much more rapidly than would be desired.

A major object of the present invention is to provide a new mechanical amplifier arrangement in which the driving motor or motors do not operate continuously, but instead are energized only intermittently as actually needed to produce the desired output torque. At the same time, however, the device is designed to respond immediately to any input force, with no more delay than occurs in a conventional arrangement in which an electric motor or the like operates continuously.

Structurally, an implifier constructed in accordance with the invention includes two rotary elements adapted to be power driven in opposite directions, and capable of being clutched selectively to the output shaft to drive it in those opposite directions as necessary in order to follow an input signal. The two power driven rotary elements are preferably driven by spring motor means, which are in turn wound intermittently by a power energized motor or motors. Automatic switch means responsive to the wound or unwound condition of the spring motor means may control the operation of the power actuated motor to always maintain the spring motor or motors in wound condition. In certain forms of the invention, two separate spring motors are employed for driving the two rotary elements respectively, together with two separate electric motors or other power actuated motors or the like for intermittently winding the two spring motors. In another form of the invention, a single electric motor and single spring motor may be employed for actuating both of the two rotary drive elements in their opposite directions.

A particular feature of the invention has to do with the provision of means for maintaining the spring motor or motors against unwinding rotation when they are not clutched to the driven shaft. For this purpose, I employ holding means acting to restrain such unwinding rotation of the spring or springs except when they are clutched to the output shaft. Various specific features of the invention relate to certain preferred arrangements to be employed as these holding means.

The above and other features and objects of the present invention will be better understood from the following detailed description of the typical embodiments illustrated in the accompanying drawings in which.

Figures 1, 5:
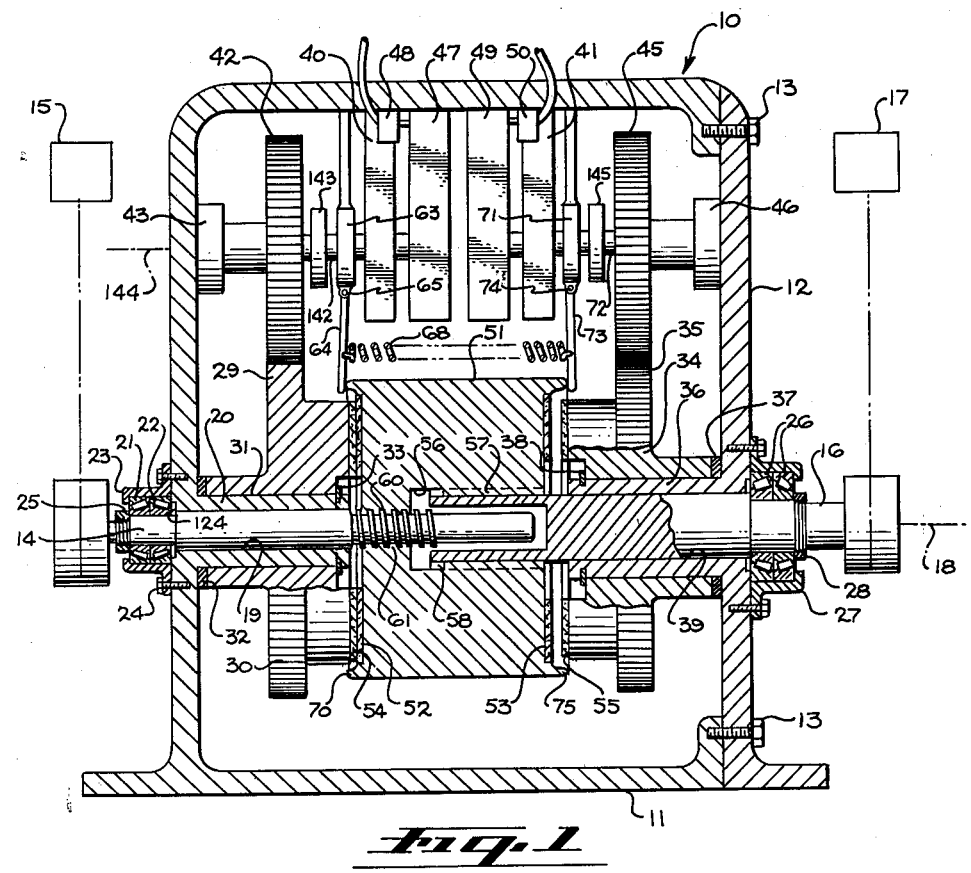
FIG. 1 is a vertical section through a first form of power amplifier constructed in accordance with the invention.
FIG. 5 is a fragmentary representation of a third form of the invention.

Referring first to FIG. 1, the first form of mechanical power amplifier illustrated in that figure includes a hollow rigid housing 10, which may include a main body section 11 and a cover 12 retained by screws 13. Input or control signals are supplied to the device by rotary movement of a control input shaft 14, which may in some instances be manually turned to control the apparatus, or may be turned by a relatively small force from any desired control unit represented typically at 15. The output shaft 16 projects from the opposite side of the housing and may be considered as driving a controlled unit diagrammatically represented at 17. The two shafts 14 and 16 are mounted for rotation about a common axis shown at 18 in the drawing.

Shaft 14 extends into the housing through a bore 19 formed in a boss or projection 20, which journals the shaft for its desired rotation about axis 18. The shaft is suitably retained against axial movement relative to the housing by means of a thrust bearing structure, typically including two roller type opposed thrust bearings 21 and 22, whose outer races are retained in fixed position by an annular retaining element 23 bolted to the housing at 24. As will be apparent, the outer races engage element 23 at one side and engage an outer surface of the housing at the other side. The inner races of the two thrust bearings 21 and 22 are clamped against a shoulder 124 on shaft 14 by means of a nut 25 threaded onto the shaft.

The output shaft 16 is also retained against axial movement, typically by means of a thrust bearing assembly of the same general type discussed above in connection with shaft 14. More particularly, this second thrust bearing assembly may include two roller type thrust bearings 26, whose outer races are clamped between a retainer 27 and cover 12 of the housing, and whose inner races are retained in fixed relation relative to shaft 16 by means of a nut 28 threaded onto the shaft.

About boss portion 20 of the housing, there is rotatably mounted an annular gear or rotary drive element 29 having a circular series of gear teeth 30 formed about its periphery. Gear 29 and boss 20 have engaging cylindrical bearing surfaces at 31, which mount the gear for rotation about axis 18. Axially between the hub portion of gear 29 and the end wall of housing section 11, there may be provided an annular thrust bushing 32 for resisting leftward axial movement of gear 29 without interfering with the free rotatability of the gear. The gear should also be retained in some manner against rightward movement (as viewed in FIG. 1), and for this purpose I have typically illustrated a snap ring 33, received within an annular groove in boss 20, and engaging a transverse shoulder formed at the right side of gear 29.

Extending about output shaft 16, at a location within the housing, there is provided a second rotary gear 34, of a construction and size essentially the same as gear 29, and having external teeth at 35. Gear 34 is rotatably mounted about a cylindrical boss 36 formed by housing cover 12, and is retained against axial movement by means of a thrust bushing 37 and a retainer ring 38, corresponding to parts 32 and 33 associated with gear 29. Internally, boss 36 has a cylindrical surface engaging a corresponding cylindrical surface on output shaft 16 at 39, to journal shaft 16 for its rotation about axis 18.

The two gears 29 and 34 are urged rotatably in opposite rotary directions by two spring motors 40 and 41. Motor 40 drives a gear 42 through a power supply shaft 142 and overrunning clutch 143. Gear 42 is mounted by a bearing 43 for rotation about axis 144 of spring motor 40. Gear 42 has peripheral teeth which mesh with the teeth 30 of gear 29, and therefore act to drive gear 29 in a predetermined rotary direction. In the particular arrangement illustrated in FIG. 1, it may be assumed that spring motor 40 tends to drive gear 29 in a clockwise direction as viewed from the left side of FIG. 1. The second spring motor 41, on the other hand, acts through an overrunning clutch 145 and a gear 45 mounted by a bearing 46 to drive gear 35 in the opposite rotary direction, that is in a counterclockwise direction as viewed from the left of FIG. 1.

Spring motor 40 is intermittently wound by an electric motor 47 controlled by an automatic switch 48 which is responsive to the extent to which the spring of spring motor 40 is wound. Whenever spring 40 reaches a predetermined partially but not completely unwound condition, switch 48 automatically energizes motor 47 to rewind the spring motor to a predetermined completely wound condition. The switch then stops motor 47 until spring motor 40 has again reached the predetermined partially unwound condition. Thus, the motor 47 is automatically and intermittently operated as required to maintain spring motor 40 continuously in a condition in which it is wound sufficiently to always exert a very strong rotary force on shaft 142. Preferably, this force exerted by the spring motor does not vary substantially at any time, regardless of the condition of the spring within motor 40. Associated with the second spring motor 41, there is provided a second electric motor 49, for winding spring motor 41 under the control of an automatic switch 50 corresponding to the previously described switch 48. Automatic switches of this type are of course well known, having been used widely for such uses as controlling the winding by an electric motor of a spring motor in an automobile clock.

At a location axially between gears 29 and 34, I provide an annular member 51 mounted for rotation about main axis 18, but free also for limited axial movement relative to gears 29 and 34. Member 51 carries two clutch discs 52 and 53 at its opposite axial sides, these discs being annular and formed of a high friction braking or clutching material tightly bonded or otherwise secured in fixed relation to member 51. Opposite discs 52 and 53, gears 29 and 34 carry a second pair of similar clutch elements 54 and 55, bonded or otherwise secured to the parts 29 and 34 respectively, and also formed of a high friction braking or clutching material. Member 51 and its carried clutch elements 52 and 53 are movable axially between a first position in which discs 53 and 55 are in clutching engagement to transmit rotation from gear 34 to member 51, and a second position in which discs 52 and 54 are in abutting engagement to transmit rotation in the opposite rotary direction from gear 29 to member 51. For transmitting rotation in either of these directions from member 51 to output shaft 16, the member 51 has an inner recess 56 into which the output shaft projects and having inner splines 57 engageable with corresponding axially extending splines 58 on the output shaft to transmit rotation from member 51 to element 16 while allowing axial movement of part 51 relative to shaft 16. This spline connection 57—58 between parts 16 and 51 also functions to mount member 51 through shaft 16 for its desired rotary movement about axis 18.

Member 51 is automatically shiftable between its two opposite driving positions, through an intermediate neutral position in which the clutch discs of neither of the two sets are in driving engagement. This automatic actuation is effected by means of a screw threaded control connection between control input shaft 14 and member 51, consisting of an externally threaded portion 60 of shaft 14 engaging internal threads 61 formed in member 51. The threads 60 and 61 may have a rather large pitch, to displace member 51 axially relatively rapidly in response to a very limited turning movement of shaft 14 relative to part 51.

When clutch faces 52 and 54 are not in engagement, shaft 142 driven by spring motor 40 is retained against rotation by means of a brake represented at 63. This brake is suitably mounted to housing 10 and is mechanically actuated by means of a lever 64 pivoted to the brake housing at 65. When member 51 is in its illustrated leftwardly actuated position, bringing discs 52 and 54 into clutching driving engagement, a peripheral annular axially projecting flange 70 on part 51 engages lever 64 and swings it to the left, as shown, to release brake 63 and thus permit rotation of gear 29 by motor 40. This rotation drives member 51 and the output shaft 16.

In conjunction with second spring motor 41, there is provided a second brake 71, operable to prevent rotation of power supply shaft 72 in a direction to unwind spring motor 41. A flange 75 on member 51 releases brake 71 through a lever 73 pivoted at 74 when clutch faces 53 and 55 move into locking engagement. Levers 64 and 73 may be spring urged toward one another, and to their braking conditions, by a common spring 68.

In describing the operation of the device of FIG. 1, assume that the control input shaft and the output shaft are connected to units 15 and 17 as shown, and assume that spring motors 40 and 41 are initially in completely wound condition, and that the electrical leads from the switches 48 and 50 are connected to a proper source of electrical energy. With the apparatus in this condition, we may first consider what happens if control input shaft 14 is turned in a clockwise direction, as viewed from the left side of FIG. 1. Such clockwise rotation of shaft 14 acts through screw threaded connection 60—61 to actuate member 51 to the FIG. 1 position, in which clutch faces 52 and 54 are in engagement. This releases brake 63 from its braking engagement with shaft 142, and motor 40 then commences to drive member 51 and the output shaft in a clockwise direction to follow the movement of the input shaft. When the control input shaft stops, or if member 51 and the output shaft overdrive the control input shaft, then the screw thread connection 60—61 actuates member 51 to the right, to release clutch discs 52 and 54 and stop the driven rotation of member 51. Simultaneously, brake 63 is actuated into braking engagement with shaft 142 to hold spring motor 40 against unwinding rotation. If control input shaft 14 is turned in a counterclockwise direction, member 51 is actuated by screw thread connection 60—61 to the right as seen in FIG. 1, and to a position in which gear 34 acts through clutch faces 53 and 55 to drive member 51 in a counterclockwise direction, to again follow the input shaft. Brake 71 functions like brake 63 to prevent unwinding rotation of spring motor 41 until the instant that clutch faces 53 and 55 are in clutching engagement, at which time the motor is freed to drive member 51. Thus, the output shaft 16 follows exactly the movements of the control input shaft 14, but with a greatly increased actuating torque supplied by the two driving spring motors 40 and 41. When either of these spring motors reaches a condition in which it is sufficiently unwound to require rewinding, then the switch 48 or 50 responds to this condition to automatically energize motor 47 or motor 49 to rewind the spring motor in question. Overrunning clutches 143 and 145 transmit rotation very positively from motors 40 and 41 to gears 42 and 45, in the directions in which motors 40 and 41 are spring driven, but will allow gears 42 and 45 to overrun the spring motors in those directions so that braking of the motors does not abruptly stop gears 29 and 35.

Figure 2:
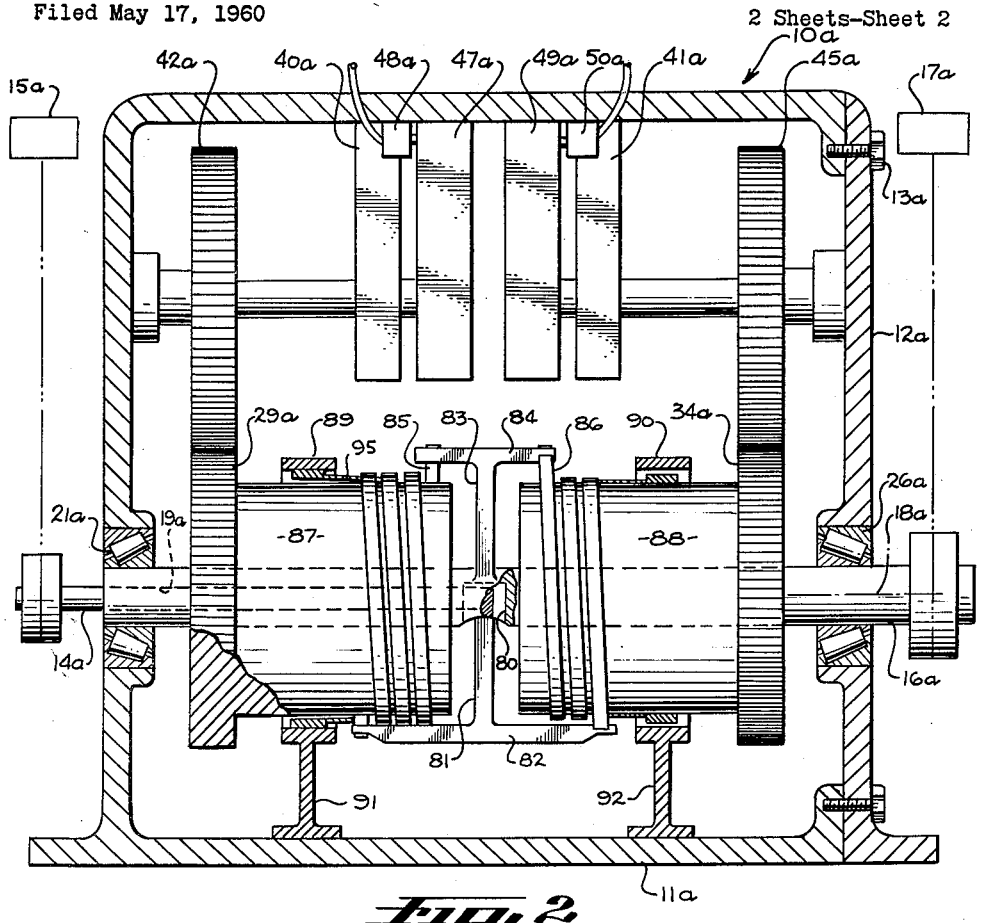
FIG. 2 is a view corresponding to FIG. 1, but showing a variational form of power amplifier embodying the invention.
Figure 4:
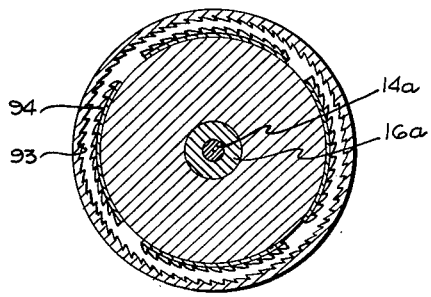
FIG. 4 is a transverse section taken on line 4—4 of FIG. 3.
Figure 3:
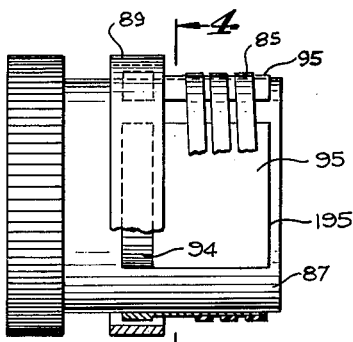
FIG. 3 is an elevational view of a portion of the FIG. 2 device.

FIGS. 2 to 4 illustrate a second form of the invention which differs primarily from the first form in the manner of construction of the clutching means. As in the first form, the housing 10a may include a main body section 11a and a cover section 12a secured thereto by screws 13a. The control input shaft 14a may be actuated manually or by a suitable control unit represented at 15a, while the output shaft 16a acts with increased torque to drive a controlled unit 17a. In this form of the invention, output shaft 16a extends axially entirely through housing 10a, being journalled at opposite sides of the housing by bearings 21a and 26a for rotation about a main axis 18a. Control input shaft 14a projects through a cylindrical bore 19a in output shaft 16a, to a central portion of the output shaft at which the latter contains a recess 80. At this location, shaft 14a rigidly carries an arm 81 which projects transversely from axis 18a, and which carries a cross-piece 82. Projecting in an opposite direction, the output shaft 16a carries a similar transversely projecting arm 83 having a cross-piece 84.

The left ends of the two cross-pieces 82 and 84 are connected as shown to the opposite ends of an elongated clutching band or strap 85. Similarly, the right ends of cross-pieces 82 and 84 are connected to opposite ends of a second clutching band or strap 86. These bands 85 and 86 are formed of a material such as leather which will not stretch appreciably, and which will afford sufficient friction to attain a driving action in a manner later to be discussed.

Corresponding to the two gears 29 and 34 of FIG. 1, the FIG. 2 device has two gears 29a and 34a. These gears are yieldingly urged in opposite rotary directions, through two gears 42a and 45a, by two spring motors 40a and 41a which are intermittently and automatically wound as necessary by two electric motors 47a and 49a under the control of automatic switches 48a and 50a corresponding to switches 48 and 50 of FIG. 1. This spring motor and winding mechanism of FIG. 2 may be substantially identical with that of FIG. 1 except for the omission of brakes 63 and 71, and therefore will not be discussed in detail.

Each of the gears 29a and 34a has an axially projecting portion forming an externally cylindrical drum 87 or 88. The previously mentioned band 85 is wound helically for several times about drum 87, while the band 86 is similarly wound about drum 88.

Disposed about the two drums 87 and 88, there are provided two stationary rings 89 and 90, secured in fixed relation to the housing by support structures 91 and 92. These two rings 89 and 90 have internal buttress teeth 93 (see FIG. 4), which are engageable with external arcuate series of buttress teeth 94 formed on a series of circularly spaced partial cylindrical elements 95 mounted to the drums. Each set of teeth 94 may be formed on an arcuate piece of metal, which is free for movement radially into and out of engagement with teeth 93.

Elements 95 may be leaf springs, each of which is welded or otherwise attached at only one end 195 to the associated drum surface 87 or 88. Specifically, each leaf spring 95 is attached to the drum at the opposite end from that at which the teeth 94 are carried. Also, the resilience of the leaf spring material tends to urge the free end and the carried teeth 94 radially outwardly into enaggement with ring 89 or 90. Bands 85 and 86 extend about the drum at locations axially between the opposite ends of elements 95, and therefore act when constricted about the drums to tightly hold elements 95 in their radially inwardly retracted positions, in which teeth 94 are not in engagement with teeth 93. Thus, when either of the bands 85 or 86 is tightened about the associated drum, the teeth 93 and 94 do not hold the drum against rotation. On the other hand, when either of the bands 85 or 86 is in a somewhat loosened condition about the associated drum, then the leaf springs 95 of that drum urge the associated teeth 94 outwardly against teeth 93, to lock that particular drum against rotation in a direction such as to allow unwinding movement of the associated spring motor 40a or 41a.

Control input shaft 14a and its carried arm 81 and cross-piece 82 are free for rotation relative to output shaft 16a through a limited arc which is suffiicent to actuate the clutch between two extreme driving positions. Between these two extreme positions, there is an intermediate neutral position in which there is no drive connection to the output shaft at all. When control input shaft 14a is actuated in a counterclockwise direction relative to output shaft 16a as far as possible, cross-piece 82 pulls on band 86 in a manner tightening that band about drum 88 and its carried leaf springs 95. This tightening of band 86 about the drum causes the band to transmit rotation from drum 88 and gear 34a to cross-piece 84 and output shaft 16a in a clockwise direction as viewed from the left side of FIG. 2. It is this direction in which the spring motor 41a tends to turn gear 34a. The ratchet teeth of ring 90 retain drum 88 against unwinding rotation in that clockwise direction except when band 86 is tightened as mentioned to transmit rotation positively to the output shaft. If control input shaft 14a is turned in a counterclockwise direction, this acts to tighten band 85 rather than band 86, and thus transmit rotation in a counterclockwise direction from drum 87 through band 85 to cross-piece 84 and the output shaft 16a. Also, this simultaneously releases the associated locking elements 94 from engagement with ring 89, which normally prevents such counterclockwise rotation of drum 87, so that the drum is free for movement in that direction under the influence of spring motor 40a. When neither of the bands 85 or 86 is wound tightly enough on the associated drum to cause a power transmitting clutching engagement with that drum, then the toothed rings of both drums are in their locking condition, and prevent either spring motor from unwinding.

FIG. 5 shows fragmentary still another form of the invention, which may be considered to be identical with that of FIG. 1 except in the following respects. In the FIG. 5 apparatus, a single electrically energized motor 47b, and a single spring motor 40b, as well as a single automatic switch 48b, are employed, instead of the double spring motor, double electric motor, and double control switch arrangement of FIG. 1. The automatic winding action of this single motor is the same as has been described in connection with both motors of FIG. 1. The single spring motor 40b drives a gear 96, which in turn drives a gear 97 mounted to a shaft 98. Shaft 98 is suitably journalled for rotation in the housing, and carries also another gear 99 which drives an idler gear 100. Gears 97 and 100 drive a pair of gears 34b and 29b which may be identical with gears 34 and 29 respectively of FIG. 1. The two gears 97 and 99 are of course both keyed to shaft 98, and as a result motor 40b acts through the discussed reversing gear arrangement to drive gears 34b and 29b in opposite rotary directions.

Instead of the brakes 63 and 71 of FIG. 1, I employ in FIG. 5 an electrically actuated brake typically represented at 101, and which acts when electrically energized to lock shaft 98 and therefore spring motor 40b against rotation in a direction to unwind the spring motor. Brake 101 is energized by power from two leads 102 connected to a suitable power source, and into one of these leads there is connected a switching mechanism responsive to axial movement of member 51b. This switching mechanism may consist of an annular insulative ring 103 carried by member 51b and carrying a conductive ring 104 centered about the main axis of the device. Whenever member 51b is in its neutral position, ring 104 simultaneously engages two electrical contacts 105 and 106 which are connected into the circuit to brake 101, and which are mounted to a suitable stationary insulating structure represented at 107. Thus, when the device is in its neutral condition, brake 101 is continuously applied, and the motor 40b is held against spring unwinding rotation. If, however, member 51 moves in either axial direction to a position in which one of its clutch faces is in driven engagement with gear 34b or gear 29b, then ring 104 moves to a position in which it no longer closes the circuit between contacts 105 and 106, and therefore brake 101 is automatically released to allow the engaged gear 29b or 34b to drive element 51b and the connected output shaft. The screw thread mechanism for actuating element 51 axially may be identical with that shown in FIG. 1.

I claim:

1. A mechanical power amplifier comprising a control input shaft, an output shaft, a first drive member to be rotatably driven in a first direction, a second drive member to be rotatably driven in a second and opposite direction, a third rotary member connected in driving relation to the output shaft, releasable clutch means operable in a first condition to transmit rotation from said first member to the third member in said first direction, and operable in a second condition to transmit rotation from said second member to the third member in said second direction, automatic control means operable to shift said clutch means between said two conditions in response to relative rotation of the control input and output shafts and in a relation causing the output shaft to follow movements of the control input shaft, spring motor means operatively connected to said first and second members to urge and drive them in said first and second rotary directions respectively, power operated motor means intermittently operable to wind said spring motor means, and holding means for retaining said spring motor means against unwinding rotation when not connected through said clutch means to said third member and the output shaft, there being means for actuating said holding means between holding and released conditions.

2. A mechanical power amplifier as recited in claim 1, in which said spring motor means include two separate spring motors for driving said first and second members respectively.

3. A mechanical power amplifier as recited in claim 1, in which said spring motor means consists of a single spring motor driving both of said first and second members.

4. A mechanical power amplifier as recited in claim 1, in which said spring motor means include two separate spring motors for driving said first and second members respectively, said power operated means including two separate electric motors, and automatic switch means for energizing said motors intermittently as required to maintain said spring motors in wound condition.

5. A mechanical power amplifier comprising a control input shaft, an output shaft, a first drive member to be rotatably driven in a first direction, a second drive member to be rotatably driven in a second and opposite direction, a third rotary member connected in driving relation to the output shaft, releasable clutch means operable in a first condition to transmit rotation from said first member to the third member in said first direction, and operable in a second condition to transmit rotation from said second member to the third member in said second direction, automatic control means operable to shift said clutch means between said two conditions in response to relative rotation of the control input and output shafts and in a relation causing the output shaft to follow movements of the control input shaft, spring motor means operatively connected to said first and second members to urge and drive them in said first and second rotary directions respectively, power operated motor means intermittently operable to wind said spring motor means, holding means for retaining said spring motor means against unwinding rotation when not connected through said clutch means to said third member and the output shaft, and means for actuating said holding means between holding and released conditions automatically in response to actuation of said clutch means.

6. A mechanical power amplifier as recited in claim 1, in which said first and second member are rotating drums, and said clutch means include two bands connected to said third member and wound about said drums respectively and tightenable thereabout in a relation to transmit rotation in said two opposite directions from said first two members to the third.

7. A mechanical power amplifier as recited in claim 1, in which said first and second members are rotating drums, and said clutch means include two bands connected to said third member and wound about said drums respectively and tightenable thereabout in a relation to transmit rotation in said two opposite directions from said first two members to the third, said means for actuating said holding means including means interposed between at least one of said drums and said band thereabout and responsive to tightening of the band on said drum to actuate said holding means.

8. A mechanical power amplifier as recited in claim 1, in which said first and second members are rotating drums, and said clutch means include two bands connected to said third member and wound about said drums respectively and tightenable thereabout in a relation to transmit rotation in said two opposite directions from said first two members to the third, said means for actuating said holding means including parts interposed radially between said drums and said bands thereabout and actuable radially inwardly by tightening of said bands, said holding means including shoulders on said parts, and stationary shoulders engageable by said first mentioned shoulders in a relation to hold each of said parts and the associated drum against unwinding rotation when that part is in a radially outer position but not when it is constricted inwardly by the associated band.

9. A mechanical power amplifier as recited in claim 1, in which said first and second members are rotating drums, and said clutch means include two bands connected to said third member and wound about said drums respectively and tightenable thereabout in a relation to transmit rotation in said two opposite directions from said first two members to the third, said means for actuating said holding means including leaf springs interposed radially between said drums and said bands thereabout and actuable radially inwardly by tightening of said bands, said holding means including teeth on said leaf springs, and stationary teeth engageable by said first mentioned teeth in a relation to hold each of said leaf springs and the associated drum against unwinding rotation when that leaf spring is in a radially outer position but not when it is constricted inwardly by the associated band, said leaf springs having first ends secured to said drums and second ends spaced axially therefrom and carrying said first mentioned teeth and spring urged radially outwardly.

10. A mechanical power amplifier comprising a control input shaft, an output shaft, a first drive member to be rotatably driven in a first direction about a predetermined axis, a second drive member to be rotatably driven in a second and opposite direction about said axis, a third rotary member connected in driving relation to the output shaft and rotatable about said axis at a location axially between said first two members, said third member being free for axial movement relative to said first two members between a first position and a second position, said third member having clutch faces at its opposite sides engageable with said first and second members respectively in a relation to be driven thereby in said first and second positions respectively of said third member, a connection between said control input shaft and said third member operable to shift said third member axially between said two positions in response to rotary movement of the control input shaft relative to said third member, spring motor means operatively connected to said first and second members to urge and drive them in said first and second rotary directions respectively, power operated motor means intermittently operable to wind said spring motor means, and holding means for retaining said spring motor means against unwinding rotation when not connected through said clutch means to said third member and the output shaft, there being means for actuating said holding means between holding and released conditions.

11. A mechanical power amplifier as recited in claim 10, in which said spring motor means include two separate spring motors for driving said first and second members respectively.

12. A mechanical power amplifier as recited in claim 10, in which said spring motor means include two separate spring motors for driving said first and second members respectively, said power operated means including two separate electric motors, and automatic switch means for energizing said motors intermittently as required to maintain said spring motors in wound condition.

13. A mechanical power amplifier comprising a control input shaft, an output shaft, a first drive member to be rotatably driven in a first direction, a second drive member to be rotatably driven in a second and opposite direction, a third rotary member connected in driving relation to the output shaft, releasable clutch means operable in a first condition to transmit rotation from said first member to the third member in said first direction, and operable in a second condition to transmit rotation from said second member to the third member in said second direction, automatic control means operable to shift said clutch means between said two conditions in response to relative rotation of the control input and output shafts and in a relation causing the output shaft to follow movements of the control input shaft, spring motor means operatively connected to said first and second members to urge and drive them in said first and second rotary directions respectively, power operated motor means intermittently operable to wind said spring motor means, and holding means for retaining said spring motor means against unwinding rotation when not connected through said clutch means to said third member and the output shaft, said spring motor means including two separate spring motors for driving said first and second members respectively, said power operated means including two separate electric motors, and automatic switch means for energizing said motors intermittently as required to maintain said spring motors in wound condition, said holding means including two brakes operable to hold said two spring motors respectively against unwinding rotation, and means for automatically actuating and releasing said two brakes in response to axial movement of said third member.

14. A mechanical power amplifier comprising a control input shaft, an output shaft, a first drive member to be rotatably driven in a first direction about a predetermined axis, a second drive member to be rotatably driven in a second and opposite direction about said axis, a third rotary member connected in driving relation to the output shaft and rotatable about said axis at a location axially between said first two members, said third member being free for axial movement relative to said first two members between a first position and a second position, said third member having clutch faces at its opposite sides engageable with said first and second members respectively in a relation to be driven thereby in said first and second positions respectively of said third member, a connection between said control input shaft and said third member operable to shift said third member axially between said two positions in response to rotary movement of the control input shaft relative to said third member, spring motor means operatively connected to said first and second members to urge and drive them in said first and second rotary directions respectively, power operated motor means intermittently operable to wind said spring motor means, and a brake for retaining said spring motor means against unwinding rotation when not connected through said clutch means to said third member and the output shaft, there being means for actuating said brake in response to axial movement of said third member.

References Cited in the file of this patent

UNITED STATES PATENTS

| | | |
|---|---|---|
| 982,868 | Press | Jan. 31, 1911 |
| 1,796,232 | Barnes | Mar. 10, 1931 |
| 2,311,010 | Vickers | Feb. 16, 1943 |
| 2,587,377 | Penrose | Feb. 26, 1952 |
| 2,939,329 | Doerries | June 7, 1960 |
| 2,975,648 | Doerries | Mar. 21, 1961 |
| 3,008,558 | Bennett et al. | Nov. 14, 1961 |